United States Patent [19]

Davy

[11] 4,133,131
[45] Jan. 9, 1979

[54] FISHING ROD STORAGE AND SUPPORT APPARATUS

[76] Inventor: Jerry D. Davy, 1201 SW. 94, Oklahoma City, Okla. 73109

[21] Appl. No.: 777,564

[22] Filed: Mar. 14, 1977

[51] Int. Cl.² .................... A01K 97/08; A01K 97/10
[52] U.S. Cl. .......................................... 43/21.2; 43/26; 211/60 R; 248/528
[58] Field of Search ............... 43/21.2, 26; 248/520, 248/528, 529, 533, 534, 156; 211/60 R

[56] References Cited

U.S. PATENT DOCUMENTS

| | | | |
|---|---|---|---|
| 1,091,491 | 3/1914 | Ebur | 43/21.2 X |
| 2,317,445 | 4/1943 | Davidson | 211/60 R |
| 2,595,230 | 5/1952 | Daviau | 43/26 |
| 3,182,937 | 5/1965 | Manning | 43/21.2 X |
| 3,204,899 | 9/1965 | Danielewicz | 248/528 X |
| 3,319,910 | 5/1967 | Collin et al. | 43/26 |

Primary Examiner—Ronald E. Suter
Attorney, Agent, or Firm—Dunlap, Codding & McCarthy

[57] ABSTRACT

A portable fishing rod storage and support apparatus generally comprised of a hinged, two-piece foldable support platform having clip members connected thereto for removably holding a fishing rod and reel assembly. In one mode, the two-piece support platform may be placed in an unfolded, planar position and suspended from a wall for storing or displaying a multi-section fishing rod and reel assembly. In another mode, the two-piece support platform may be placed in a folded, angular position and anchored to the ground via staking assemblies, along side a body of water, for holding an assembled fishing rod and reel assembly at a predetermined angle in relation to the water. A locking brace is connected between the two pieces forming the support platform for selectively adjusting and maintaining a desired support angle.

9 Claims, 8 Drawing Figures

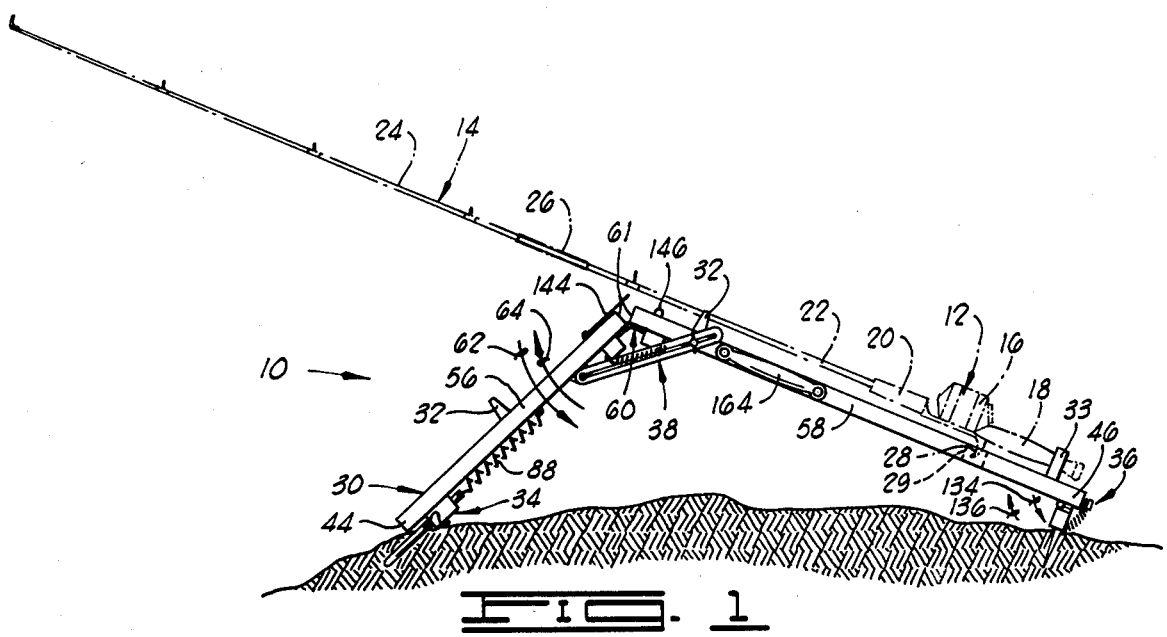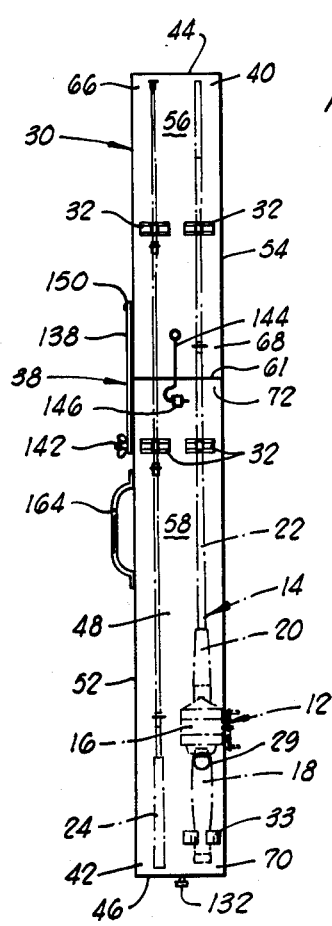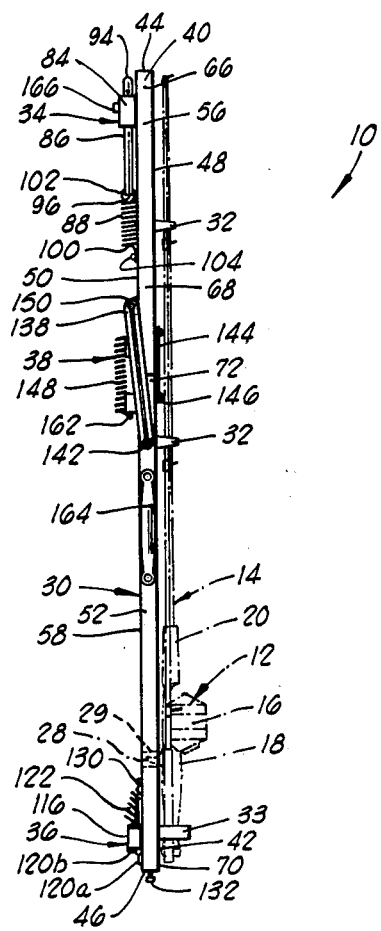

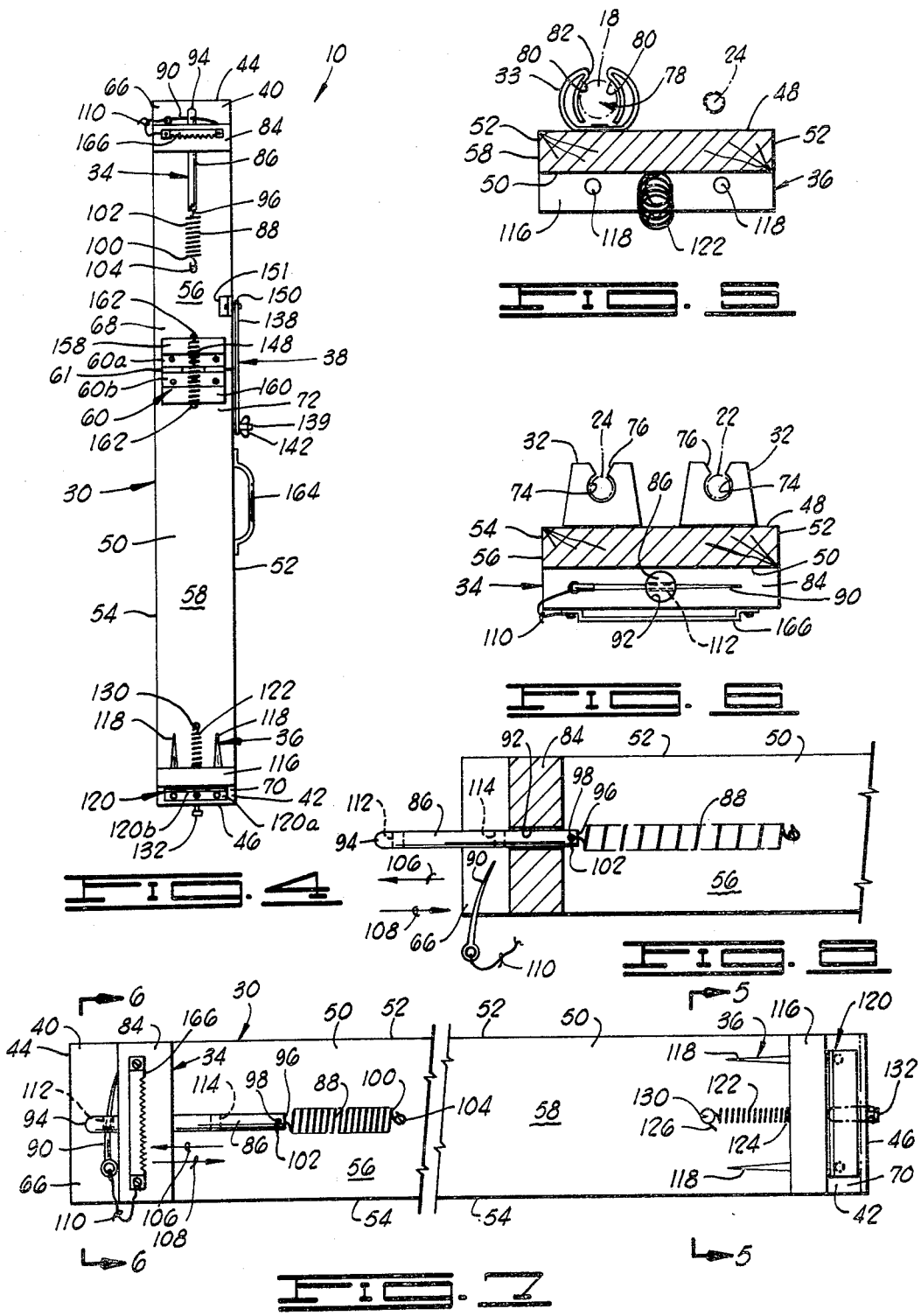

FISHING ROD STORAGE AND SUPPORT APPARATUS

BACKGROUND OF THE INVENTION

1. Field of the Invention

The present invention relates generally to the field of fishing equipment and, more particularly, but not by way of limitation, to the field of fishing rod storage and support apparatus.

2. Description of the Prior Art

When fishing from a bank alongside a body of water with a conventional rod and reel assembly, it is usually necessary for a fisherman to manually hold the assembly at all times. Otherwise, quick access to the reel is impaired, should a fish strike the line. This presents a major drawback in that at least one, and usually both, of the fisherman's hands must continuously hold the rod and reel assembly. It is therefore desirable to have a means or apparatus which will support the rod and reel assembly and free both of the fisherman's hands for other use. Furthermore, the rod and reel assembly should be positioned such that the reel remains close-at-hand at all times. An example of a related apparatus is shown in the U.S. Pat. No. 3,327,978, issued to Gates.

During periods of infrequent use, it is also desirable to have a means, or apparatus, with which to store a rod and reel assembly. This is especially so in the case of multi-sectioned fishing rods. Unless properly stored, the various sections of such a fishing rod may become separated or lost. An example of a fishing rod storage apparatus is shown in the U.S. Pat. No. 2,595,230, issued to Daviau.

It will be desirable and advantageous to have a single apparatus for the storage, support and display of a fishing rod and reel assembly. The present invention provides an apparatus which, in one mode, can be suspended from a wall, or the like, while holding a disassembled, multi-section rod and reel assembly; and, in another mode, an apparatus which provides support for, and selective positioning of, the same fishing rod and reel assembly alongside a body of water.

SUMMARY OF THE INVENTION

The present invention is a fishing rod storage and support apparatus. The apparatus generally comprises a two-piece, foldable support platform having clip members connected thereto for removably holding a rod and reel assembly, and a staking assembly for anchoring the support platform to the ground alongside a body of water. The support platform is generally comprised of a first member and a second member which are hingedly connected. The first member is selectively positionable with respect to the second member. A locking means is provided to maintain the first and second members in a predetermined angular position with respect to the water.

The first and second members can also be locked into position to form a single longitudinal member which can be suspended from a wall or inside a display cabinet. The clip assembly also removably holds the several sections of a multi-section rod and reel assembly when the apparatus is in the storage, or display, position. A handle is also provided for the convenience of carrying the apparatus from one location to another.

An object of this invention is to provide an apparatus which allows a fisherman the full use of both hands at all times while engaged in the activity of fishing.

Another object of the present invention is to provide a fishing rod storage and support apparatus which can quickly and easily be adjusted to a predetermined angular position relative to a body of water being fished.

One other object of the present invention is to provide a storage apparatus for a multi-section fishing rod which maintains the several sections thereof together at all times.

Another object of the present invention is to provide a fishing rod storage and support apparatus which can serve as an attractive display case for a fishing rod and the like.

Still another object of the present invention is to provide a portable fishing rod storage and support apparatus.

One other object of the present invention is to provide a fishing rod storage and support apparatus which is of inexpensive and simple construction.

Other objects, features and advantages of the present invention will become clear when reading the following detailed description of the preferred embodiment when read in conjunction with the accompanying drawings and appended claims.

BRIEF DESCRIPTION OF THE DRAWINGS

FIG. 1 is a side elevational view of a fishing rod storage and support apparatus constructed in accordance with the present invention and depicted in a fishing mode.

FIG. 2 is a top plan view of the apparatus of FIG. 1 depicted in a storage and display mode.

FIG. 3 is a side view of the apparatus of FIG. 2.

FIG. 4 is a bottom plan view of the apparatus of FIG. 2.

FIG. 5 is a cross sectional view taken at 5—5 in FIG. 7.

FIG. 6 is a cross sectional view taken at 6—6 in FIG. 7.

FIG. 7 is an enlarged, partial plan view similar to FIG. 4.

FIG. 8 is an enlarged, partially cross sectional view of one of the ends of the apparatus as shown in FIG. 4.

DESCRIPTION OF THE PREFERRED EMBODIMENT

Referring to the drawings in general and to FIG. 1 in particular, shown therein and designated by the general reference numeral 10 is a fishing rod storage and support apparatus constructed in accordance with the present invention. The fishing rod storage and support apparatus 10 (sometimes hereinafter known as the apparatus 10) may be utilized to removably hold and support a conventional rod and reel assembly 12 in the position or mode shown in broken line depiction in FIG. 1. In the preferred embodiment, the rod and reel assembly 12 is generally comprised of a multi-section rod assembly 14 and a reel 16 connected to a portion of the rod assembly 14. The apparatus 10 may also be utilized to removably hold the sections of the rod assembly 14 in a storage, or display, position or mode as can be seen more clearly in FIG. 2. Of course, a rod and reel assembly comprising a single-section rod could also be supported by the apparatus 10 in the position shown in FIG. 1.

A typical multi-section rod assembly, such as the rod assembly 14, is generally comprised of a handle 18, a reel support 20, a first section 22 and a second section 24. The first and second sections 22 and 24, respectively, generally snap or screw together to form a joint 26. A conventional reel, such as the reel 16, is generally connected via attaching means to the reel support 20 in the position generally shown in FIGS. 1, 2 and 3. A horn-like appendage 28 is usually formed integrally with the reel support assembly 20 to provide a better grip for a fisherman.

Since most commercially available rod and reel assemblies, such as the rod and reel assembly 12, are generally similar in size and shape, the fishing rod storage and support apparatus 10 is substantially universal in application. The apparatus 10 is generally comprised of a two-piece support platform 30, a plurality of resilient clips 32, a first staking assembly 34, a second staking assembly 36, and a locking brace assembly 38.

The support platform 30 is of a two-piece construction, as can be seen more clearly in FIG. 1, for the selective positioning of the rod and reel assembly 12 at a predetermined angle in relation to the level of a nearby body of water. The resilient clips 32 are utilized to removably hold portions of the rod assembly 14 while maintaining the rod and reel assembly 16 readily accessible to a fisherman. The first and second staking assemblies 34 and 36, respectively, are utilized to anchor the apparatus 10 into the ground alongside the nearby body of water to provide a stationary support for the apparatus 10. The locking brace assembly 38 is utilized to maintain the support platform 30 in a desired preselected position, and to provide a support platform which is easily and quickly adjustable.

An additional resilient clip 33 may be connected to the support platform 30 to removably hold the handle 18 of the rod assembly 14. The clip 33 is somewhat different in construction and physically larger than one of the clips 32 to accommodate the relatively larger size of the handle 18.

A cavity 29 is formed in a portion of the support platform 30 to accommodate the horn-like appendage 28. The cavity 29 may be lined with a resilient material (not shown) to provide a snug fit for the appendage 28.

In the preferred embodiment, the support platform 30 is constructed of a rigid material such as nominal 1 inch by 4 inch lumber components, for example. The support platform 30 has a first end 40 and an opposite second end 42 (that is, opposite in the display position of the apparatus 10 shown in FIG. 2). The first end 40 is further defined by a first end face 44, and the second end 42 is, similarly, defined by a second end face 46. A first face 48 and a second face 50, are formed and extend between the first and second end faces 44 and 46, respectively, in the storage and display position of the apparatus 10, as can be seen more clearly in FIG. 3. When the apparatus 10 is suspended from a vertical wall, or the like, the first end 40 may be considered to be the upper end, and the second end 42 may be considered to be the lower end. Also, in the storage and display position, the first face 48 faces away from the wall, and the second face 50 faces toward the wall.

The support platform 30 is further defined as having a first edge face 52, and a second edge face 54. The first edge face 52 and the second edge face 54 each extend longitudinally between the first and second end faces 44 and 46, and are disposed between the first and second faces 48 and 50, in the support and display position of the apparatus 10, the first edge face 52 being shown more clearly in FIG. 3. Furthermore, the first and second edge faces 52 and 54 are substantially spaced-apart by the width of the components forming the support platform 30. It should be noted, that in the storage and display position of the apparatus 10, as can be seen more clearly in FIGS. 2 and 4, the first and second edge faces 52 and 54 cooperate with the first and second end faces 44 and 46 to form a continuously extending, rectangularly shaped outer peripheral surface of the fishing rod storage and support apparatus 10.

As was discussed above, the support platform 30 is of a two-piece construction, and more particularly, the support platform 30 is comprised of a first platform member 56 and a second platform member 58. The first platform member 56 generally defines the first end 40 of the support platform 30, and the second platform member 58 generally defines the second end 42 of the support platform 30. The first platform member 56 is pivotally connected to the second platform member 58 via a hinge 60, as can be seen more clearly in FIGS. 1 and 4. A hinge-joint 61 is formed at a medial portion of the support platform 30 via the hinged connection of the first platform member 56 and the second platform member 58. When the apparatus 10 is changed from the unfolded storage and display position to the folded angular or fishing position, the first platform member 56 is moved in a first pivotal direction 62 in relation to the second platform member 58 as the hinge-joint 61 opens. In turn, when changing the apparatus 10 from the folded angular or fishing position to the unfolded storage and display position, the first platform member 56 is moved in a second pivotal direction 64 in relation to the second platform member 58 with the hinge-joint 61 closing. That is, in the storage and display position, the first platform member 56 and the second platform member 58 are positioned to extend generally in a coplanar relationship.

Since the first platform member 56 and the second platform member 58 cooperate to form the support platform 30, the first platform member 56 and the second platform member 58 equally share the physical characteristics defining the support platform 30. That is to say, the first platform member 56 and the second platform member 58 are each similarly defined via portions of the first and second faces 50 and 52, respectively, and the first and second edge faces 52 and 54, respectively. The first end face 44 of the support platform 30 forms an end portion of the first platform member 56. Correspondingly, the second end face 46 forms an end portion of the second platform member 58.

The first platform member 56 has a first end 66 which is coterminous with the first end 40 of the support platform 30. The first platform member 56 also has a second end 68 which forms a medial portion of the support member 30 in the unfolded position thereof, and partially defines the hinge-joint 61.

The second platform member 58 is similar to the first platform member 56. Furthermore, the second platform member 58 has a first end 70 which is coterminous with the second end 42 of the support platform 30. The second platform member 58 also has a second end 72 which cooperates with the second end 68 of the first platform member 56 to form a medial portion of the support platform 30, in the unfolded position thereof, and a portion of the hinge-joint 61. In other words, the second end 68 of the first platform member 56 is specifically pivotally connected to the second end 72 of the second platform member 58 via the hinge 60.

The hinge 60 is constructed of similar hinge members 60a and 60b, as can be seen more clearly in FIG. 4. The hinge member 60a is specifically connected to a portion of the second face 50 near the second end 68 of the first platform member 56. The hinge member 60b is similarly connected to the second face 50 of the second platform member 58 near the second end 72 thereof. A pivot shaft (not shown) is utilized to interconnect the hinge members 60a and 60b in a conventional manner.

The preferred arrangement of the resilient clips 32 is shown more clearly in FIG. 2. Additionally, a side view of some of the clips 32 is shown in FIG. 3, and a front elevational view of some of the clips 32 is shown in FIG. 6. Each clip 32 has a bore 74 formed therethrough. The axis of the bore 74 of each resilient clip 32 is generally parallel to the first face 48 of the support platform 30 in an assembled position of the respective clip 32 and the support platform 30. Additionally, a tapered opening 76 is also formed through each clip 32. Each tapered opening 76 intersects a portion of an associated bore 74 such that by positioning a portion of one of the rod sections, 22 or 24, in one of the tapered openings 76, and by pushing on the rod section 22 or 24 in a direction toward the respective bore 74, the tapered opening 76 is caused to expand with the rod section 22 or 24 being received by the bore 74. Since the clips 32 are resilient, as soon as the rod section 22 or 24 is positioned within the bore 74, as can be seen more clearly in FIG. 6, the tapered opening 76 resumes its original position (assuming that the diameter of the rod section 22 or 24 is smaller than the diameter of the bore 74).

As can be seen more clearly in FIG. 2, two of the resilient clips 32 are connected to a medial portion of the first side surface 48 of the first platform member 56. The respective bores 74 formed through the clips 32 are disposed in a parallel, spaced-apart relationship with the clips 32 being disposed in a transverse fashion across the width of the first side surface 48 of the first platform member 56.

There are also two of the resilient clips 32 connected to a portion of the first side surface 48 of the second platform member 58 near the second end 72 thereof. These clips 32 are positioned in a manner similar to the clips 32 which are connected to the first platform member 56. More particularly, each respective bore 74 formed through one of the clips 32 which is connected to the second platform member 58 is in axial alignment with a corresponding bore 74 formed through one of the clips 32 which is connected to the first platform member 56. This relationship is shown more clearly via the phantom view of the rod and reel assembly 12 shown in an assembled position with the clips 32 in FIGS. 2 and 3.

As can be seen more clearly in FIG. 5, the clip 33 utilized to removably hold the handle 18 of the rod assembly 14 is constructed from a single strip of flexible metal that has been formed into a spring-like clip. A cavity 78 is formed between two opposing ribs 80. An opening 82 is also formed between opposing end portions of the ribs 80, the opening 82 intersecting the cavity 78. In order for the handle 18 to be removably held by the clip 33, the handle 18 is positioned against the end portions of the ribs 80 adjacent to the opening 82 and forced in a direction toward the cavity 78. The force causes the ribs 80 to expand away from each other allowing the handle 18 to be received and positioned within the cavity 78. Since the clip 33 is spring-like in nature, the ribs 80 tend to assume their normal position and thereby exert a gripping force on the handle 18.

The first staking assembly 34 is utilized to anchor the support platform 30 to the ground near a body of water. The first staking assembly 34 has a retracted position, shown more clearly in FIGS. 3, 4, and 7, and an extended position, shown more clearly in FIGS. 1 and 8. The first staking assembly 34 is normally maintained in the retracted position when the support platform 30 is in the storage and display position (for example, when the apparatus 10 is supported by a wall). On the other hand, the first staking assembly 34 is placed in the extended position when it is desired to anchor the apparatus 10 to the ground.

Referring again to FIGS. 3, 4, 7, and 8, the first staking assembly 34 is generally comprised of: a support block 84, a rod 86, a coil retainer spring 88, and a retainer pin 90. As can be seen more clearly in FIGS. 6, 7, and 8, the support block 84 is connected transversely across a portion of the second side surface 50 of the first platform member 56 near the first end 66 thereof. Furthermore, a bore 92 is formed through a medial portion of the support block 84, the axis of the bore 92 being generally parallel to the second side surface 50 of the first platform member 56.

The rod 86 is generally cylindrical in shape, has a diameter slightly less than that of the bore 92, and is disposed to be slidable within the bore 92 from the retracted position (FIG. 7) to the extended position (FIG. 8). The rod 86 has a rounded first end 94 and an opposite second end 96. A bore 98 is formed diametrically through the rod 86 near the second end 96.

The retainer spring 88 has a looped first end 100 and a looped second end 102. The first end 100 of the spring 88 is specifically secured to the second side surface 50 of the first platform member 56 via a fastener 104 (for example, a wood screw). The second end 102 of the spring 88 is looped through the bore 98 formed through the second end 96 of the rod 86. When the rod 86 is moved from the retracted position in a first direction 106 via a pulling force, the spring 88 will be stretched into the position thereof shown in FIG. 8. If, thereafter, the rod 86 is released, or not allowed to remain in the extended position, the biasing action of the spring 88 will cause the rod 86 to return to the retracted position moving in a second direction 108.

The retainer pin 90, which may be a conventional cotter pin, is preferably connected to some portion of the apparatus 10 to prevent the accidental loss thereof. As shown in FIG. 7, a connector line 110 is attached to the pin 90 and to the support block 84.

A bore 112 is formed diametrically through a portion of the rod 86 near the first end 94, and when the rod 86 is in the retracted position, the retainer pin 90 may be disposed through the bore 112. It is preferable that the relative positions of the spring 88 and the bore 112 are such that, in the retracted position of the rod 86, the rod 86 must be moved a slight distance in the first direction 106 for the bore 112 to be disposed outside of the bore 92 formed through the support block 84. Thus, when the pin 90 is inserted through the bore 112, the rod 86 will tend to move in the second direction 108 via the biasing effect of the spring 88. However, the pin 90 will bear against the support block 84 and prevent the rod 86 from returning to a fully retracted position. A tension will thereby be maintained on the rod 86 and the spring 88 such that there is substantially no slack in the first staking assembly 34 in the retracted position thereof.

A bore 114, similar to the bore 112 is also formed diametrically through the rod 86. When it is desired to move the first staking assembly 34 to the extended position, the retainer pin 90 is removed from the bore 112 and the rod 86 is moved in the first direction 106 until the bore 114 is positioned outside of the bore 92, between the support block 84 and the first end face 44. The retainer pin 90 is then inserted through the bore 114 so that the rod 86 is maintained in the extended position via the retainer pin 90 bearing against the block 84. The length of the rod 96 and the location of the bore 114 are selected such that the end 94 extends a predetermined distance in the direction 106 beyond the first end 40 of the support platform 30 when the rod 86 is placed in its extended position.

Referring to FIGS. 1 and 7, the second staking assembly 36 is connected generally to the second side surface 50 of the second platform member 58 near the first end 70 thereof. The second staking assembly 36 cooperates with the first staking assembly 34 to anchor the apparatus 10 to the earth. However, the second staking assembly 36 is constructed substantially different from the first staking assembly 34, as will be made more apparent below.

The second staking assembly 36 is generally comprised of a support block 116, similar to the support block 84; a pair of cleats 118; a hinge 120, similar to the hinge 60; and a coil spring 122, similar to the spring 88. The second staking assembly 36, which has a retracted position and an extended position, is shown in its retracted position in FIGS. 3 and 7, and in its extended position in FIG. 1.

The hinge 120, in like manner to the hinge 60, is generally connected to the second platform member 58 adjacent the second end face 46, and is connected to a portion of the support block 116 such that the support block 116 is maintained in contact against the second side surface 50 in the retracted position of the second staking assembly 36, as can be seen more clearly in FIG. 3.

The cleats 118 are connected to the support block 116 such that, in the retracted position of the support block 116, the cleats 118 extend generally parallel to the second side surface 50 with each cleat 118 tapering to a sharp point in a direction toward the second end 72 of the second platform member 58. The cleats 118 may be in the form of screws or nails, for example, which have been inserted or driven through the support block 116.

The spring 122, in like manner to the spring 88, has a first end 124 connected to the support block 116, via a conventional fastener (not shown), such as a wood screw, for example; and a second end 126 that has a loop which is connectable to a fastener stake 130 (e.g., a wood screw) that extends from the second side surface 50 of the second platform member 58 a predetermined distance away from the first end 70 thereof.

When it is desired to maintain the second staking assembly 36 in the retracted position, the loop formed on the second end 126 of the spring 122 is positioned over the fastener 130. The fastener 130 is positioned far enough away from the support block 116 such that the spring 122 must be slightly stretched in order to connect the looped second end 126 over the fastener 130. The support block 116 and the spring 122 are thereby placed under tension via the stretching of the spring 122 with the second staking assembly 36 being maintained in the retracted position.

Another fastener 132, similar to the fastener 130, is connected to the second end face 46. When it is desired to move the second staking assembly 36 from the retracted position to the extended position, the looped second end 126 of the coil spring 122 is removed from the fastener 130, the support block 116 is moved in a pivotal direction 134 on the hinge 120, and the looped second end 126 of the coil spring 122 is connected over the fastener 132. The fastener 132 is also positioned far enough away from the support block 110 that the spring 122 must again be stretched in order to connect the looped second end 126 over the fastener 132. The support block 116 and the spring 122 are thereby again placed in tension with the result that the second staking assembly 36 is thereby maintained in the extended position.

As can be seen more clearly in FIG. 1, movement of the support block 116 in the pivotal direction 134 is limited by the hinge 120. The cleats 118 extend generally perpendicularly away from the second platform member 58 when the support block 116 reaches its limit of travel in the pivotal direction 134. It should be noted that the distance between the support block 116 and the fastener 132 is such that, in the extended position of the first staking assembly 36, the coil spring 122 is extended whereby the support block 116 and the cleats 118 are maintained in the extended position. Of course, when it is desired to move the second staking assembly 36 from the extended position back to the retracted position, the looped end 126 of the coil spring 122 is merely removed from the fastener 132 and the support block 116 is moved in a pivotal direction 136 until stopped via contacting the second side surface 50. Then the looped second end 126 of the spring 122 is reconnected over the fastener 130.

As was stated above, the locking brace assembly 38 is utilized to maintain the first platform member 56 and the second platform member 58 in a desired angular relationship. In the preferred embodiment, and referring to FIGS. 2, 3, and 4, the locking brace assembly 38 is generally comprised of a slotted plate 138, an externally threaded post 139, a threaded wing nut 142 positioned on the post 139, a pivotal hook 144, an eye connector 146, and a coil spring 148.

The slotted plate 138 has a first end 150 pivotally connected to a portion of the first platform member 56 adjacent the first edge face 52 near the second end 68 of the first platform member 56. In the preferred embodiment, the first end 150 is pivotally connected to the first platform member 56 via a flange bracket 151 connected to a portion of the second side surface 50. The slot of the slotted plate 138 is slidingly disposed over the post 139 and the wing nut 142 is positioned on the post 139 as shown. The wing nut 142 can be tightened against or loosened from the slotted plate 138 to effectuate the angular positioning of the support platform 30 such as, for example, is shown in FIG. 1 wherein the support platform 30 is folded on its hinge 60 in a selected fishing mode.

Referring to FIG. 2, the hook 144 is pivotally connected to a medial portion of the first side surface 48 of the first platform member 56 near the second end 68 thereof (this is, near the joint 61). The eye connector 146 is connected to the second side surface 50 of the second member 58 near the second end 68 thereof (also near the joint 61), generally opposite the hook 144. The hook 144 and the eye connector 146 are positioned in such a spatial relationship that when the support platform 30 is in the planar unfolded position, the hook 144 can be pivoted to engage the eye connector 146. When it is desired to move the support platform 30 from its support and display mode to its fishing mode (that is, move the first platform member 56 in the first pivotal direction 62 relative to the second platform member 58), the hook 144 is simply disengaged from the eye connector 146.

As can be seen more clearly in FIGS. 1 and 4, a support block 158 and a support block 160 are connected to corresponding portions of the second side surface 50 adjacent the hinge 60. More particularly, the support block 158 is positioned adjacent the hinge member 60a, and the support block 160 is positioned adjacent the hinge member 60b. As shown in FIGS. 3 and 4, opposite ends of the coil spring 148 are connected to the support blocks 158 and 160 via conventional fasteners 162 (such as wood screws). The coil spring 148 is connected between the support blocks 158 and 160 such that the spring 148 is stretched slightly when the support platform 30 is placed in its unfolded position, that is, when placed in its storage and display mode as shown in FIGS. 2, 3, and 4. A tension force is thereby created between the first platform member 56 and the second platform member 58, this tension force cooperating with the hook 144 and the eye 146 to lock the support platform 30 in its storage and display mode.

A handle 164 is connected to a medial portion of the first edge surface 52 on the second platform member 58, near the second end 72 thereof. Also, as can be seen more clearly in FIGS. 4 and 7, a conventional "saw tooth" type of wall hanger bracket 166 is connected to a portion of the support block 116 to provide a means for hanging the fishing rod storage and support apparatus 10 on a vertical wall.

The operation of the fishing rod storage and support apparatus 10 has been described above as each of its components has been described in detail. However, it is believed that a brief summary may be helpful to provide a full appreciation of the many attributes of the present invention. As depicted in FIG. 1, the support platform 30 has been folded into a desired angular positon about the hinge 60 and secured in this position by tightening the wing-nut 142 on the post 139 against the slotted plate 138. The support platform 30 is thereby placed in its fishing mode, and it is made to be maintained in a stationary position by engaging the earth with the cleats 118 and the anchoring rod 86 as shown. Of course, this is accomplished following the placement of the first staking assembly 34 and the second staking assembly 36 in their extended positions in the manner described herein above.

Once the support platform 30 has been stabilized and made stationary in its fishing mode, the rod and reel assembly 12 is assembled and mounted onto the second platform member 58 in the manner described above and depicted in broken line manner in FIG. 1. This permits the fisherman to locate his rod and reel assembly in any selected position, and once the set up is completed, he is free to attend other manners while knowing that his fishing gear is secure. When a fish strikes the bait, the staking assemblies 34, 36 make sure that the rod and reel assembly is not lost, while at the same time, the rod 14 is extended in like manner as if it were hand held.

The fishing rod storage and support apparatus 10 is designed and constructed such that a fisherman can use several such apparatus at any given time, as each such fishing rod storage and support apparatus requires a minimum of set up and attention time.

When the support platform 30 is placed in its planar position, that is, in its storage and display mode, in the manner described herein above and which is depicted for example in FIG. 2, the support platform 30 provides a portable apparatus that may be easily carried via the handle 164. In this position, the rod and reel assembly 12 have been disassembled and the section 24 of the rod assembly 14 may be secured via the set of clips 32 provided for this purpose and described fully above. The remaining portion of the rod assembly 14 is also secured to the first and second support platforms 56, 58 via the clips 32 that are provided for this purpose and described hereinabove. Thus the rod and reel assembly 12 is fully secured to the support platform 30 at all times.

It should be noted that the fishing rod storage and support apparatus 10 provides a handsome display stand when the support platform 30 is in its storage and display mode as depicted, for example, in FIG. 2. That is, the fishing rod storage and support apparatus 10 may be supported on a vertical wall or the like via the hanger 166 and a nail or the like extending from the wall. While attractively displaying a fishing rod, this display feature also provides a means whereby the fishing rod storage and support apparatus 10 may be protected while being maintained completely ready for use by the fisherman at all times.

It will be clear that the present invention offers many benefits and features that fully meet the above stated objects. Of course, it will be realized that changes may be made in the construction and arrangement of the parts, elements and assemblies of the embodiment disclosed herein without departing from the spirit and scope of the invention as defined in the following claims.

What is claimed is:

1. A fishing rod storage and support apparatus for supporting a rod and reel assembly, comprising:
   a support platform having a first end and a second end, and comprising a first platform member and a second platform member;
   connector means for pivotally connecting the first and the second platform members, the connector means disposed between the first and second ends of the support platform, the support platform having a fishing mode wherein the first platform member is angularly disposed relative to the second platform member at a selectable angle, the support platform also having a storage and display mode wherein the first and second platform members are positioned to extend generally in planar relationship;
   brace means for alternatively locking the support platform in the fishing mode and in the storage and display mode; and
   holding means for removably connecting the rod and reel assembly to the support platform in each of said modes.

2. A fishing rod storage and support apparatus for supporting a rod and reel assembly, comprising:
   a support platform having a first end and a second end, and comprising a first platform member and a second platform member;
   connector means for pivotally connecting the first and the second platform members, the connector means disposed between the first and second ends of the support platform, the support platform having a fishing mode wherein the first platform member is angularly disposed relative to the second platform member at a selectable angle, the support platform also having a storage and display mode wherein the first and second platform members are positioned to extend generally in planar relationship;

brace means for alternatively locking the support platform in the fishing mode and in the storage and display mode;

holding means for removably connecting the rod and reel assembly to the support platform in each of modes; and staking means for detachably anchoring the support platform to the earth when the support platform is in the fishing mode.

3. The apparatus of claim 2 wherein the holding means comprises:

first clip means for detachably connecting one portion of the rod and reel assembly to the first and second platform members; and second clip means for detachably connecting another portion of the rod and reel assembly to the first and second platform members.

4. The apparatus of claim 3 wherein the first clip means comprises:

a plurality of clips having axially aligned and accessible bores whereby the portion of the rod and reel assembly supportable thereby is attachable and detachable thereto by forceably moving the portion of the rod and reel assembly relative thereto; and wherein the second clip means is characterized as comprising:

a plurality of clips having axially aligned and accessible bores whereby the other portion of the rod and reel assembly supportable thereby is attachable and detachable thereto by forceably moving the other portion of the rod and reel assembly relative thereto.

5. The apparatus of claim 4 wherein the locking brace means is defined further as comprising:

a slotted plate having one end pivotally connected to the first platform member;

a threaded post supported by the second platform member and extending through the slot of the slotted plate;

a fastener threadingly supported by the threaded post whereby slotted plate is secured against the second platform member in the selected angular position of the support platform;

biasing means connected to the first and second platform members for biasing the first and second platform members to pivot towards a position wherein the support platform is in the storage and display mode; and means for selectively maintaining the support platform in the storage and display mode.

6. The apparatus of claim 5 further comprising:

hanger means for removably supporting the support platform on a generally vertical surface.

7. The apparatus of claim 6 further comprising:

handle means supported by the support platform for carrying the support platform when positioned in the storage and display mode.

8. The apparatus of claim 5 wherein the staking means comprises:

a first staking assembly connected to the support platform near the first end thereof, the first staking assembly comprising:

a support block connected to the support platform near the first end thereof, the support block having a bore formed therethrough;

a rod slidingly disposed in the bore formed through the support block, the rod having a tapered end and positionable alternatively in a retracted position and an extended position, the tapered end of the rod being disposed between the support block and the first end of the support platform in the retracted position, the tapered end of the rod being extended beyond the first end of the support platform in the extended position; and means for selectively maintaining the rod alternatively in the retracted position and in the extended position.

9. A fishing rod storage and support apparatus for supporting a rod and reel assembly, comprising:

a support platform having a first end and a second end, and comprising a first platform member and a second platform member;

hanger means for removably supporting the support platform on a generally vertical surface;

handle means supported by the support platform for carrying the support platform when positioned in the storage and display mode;

connector means for pivotally connecting the first and the second platform members, the connector means disposed between the first and second ends of the support platform, the support platform having a fishing mode wherein the first platform member is angularly disposed relative to the second platform member at a selectable angle, the support platform also having a storage and display mode wherein the first and second platform members are positioned to extend generally in planar relationship;

brace means for alternatively locking the support platform in the fishing mode and in the storage and display mode, the brace means comprising:

a slotted plate having one end pivotally connected to the first platform member;

a threaded post supported by the second platform member and extending through the slot of the slotted plate;

a fastener threadingly supported by the threaded post whereby slotted plate is secured against the second platform member in the selected angular position of the support platform;

biasing means connected to the first and second platform members for biasing the first and second platform members to pivot towards a position wherein the support platform is in the storage and display mode; and means for selectively maintaining the support platform in the storage and display mode;

holding means for removably connecting the rod and reel assembly to the support platform, the holding means comprising:

first clip means for detachably connecting one portion of the rod and reel assembly to the first and second platform members, the first clip means comprising a plurality of clips having axially aligned and accessible bores whereby the portion of the rod and reel assembly supportable thereby is attachable and detachable thereto by forceably moving the portion of the rod and reel assembly relative thereto; and second clip means for detachably connecting another portion of the rod and reel assembly to the first and second platform members, the second clip means comprising a plurality of clips having axially aligned and accessible bores whereby the other portion of the rod and reel assembly supportable thereby is attachable and detachable thereto by forceably moving the other portion of the rod and reel assembly relative thereto; and staking means for detachably anchoring the support platform to the earth when the support platform is in the fishing mode, the staking means comprising:

a first staking assembly connected to the support platform near the first end thereof, the first staking assembly comprising:

a support block connected to the support platform near the first end thereof, the support block having a bore formed therethrough;

a rod slidingly disposed in the bore formed through the support block, the rod having a tapered end and positionable alternatively in a retracted position and an extended position, the tapered end of the rod being disposed between the support block and the first end of the support platform in the retracted position, the tapered end of the rod being extended beyond the first end of the support platform in the extended position; and means for selectively maintaining the rod alternatively in the retracted position and in the extended position; and a second staking assembly connected to the support platform and comprising:

a support block;

connecting means for pivotally connecting the support block near the second end of the support platform;

a cleat member supported by the support block, the support block being alternatively positionable in an extended position and in a retracted position, the cleat member disposed to be near the support platform when the support block is in the retracted position, and the cleat member being positioned to extend in a direction generally normal to the support platform; and means for selectively maintaining the support block in the retracted position and in the extended position.

* * * * *